United States Patent
Maier et al.

(10) Patent No.: US 9,090,200 B2
(45) Date of Patent: Jul. 28, 2015

(54) TAILGATE

(75) Inventors: Peter Maier, Singen (DE); Jurgen Seussler, Singen (DE)

(73) Assignee: Peter Maier Leichtbau GmbH, Singen (DE)

(*) Notice: Subject to any disclaimer, the term of this patent is extended or adjusted under 35 U.S.C. 154(b) by 1322 days.

(21) Appl. No.: 11/917,587

(22) PCT Filed: Jun. 16, 2006

(86) PCT No.: PCT/EP2006/005818
§ 371 (c)(1),
(2), (4) Date: Dec. 14, 2007

(87) PCT Pub. No.: WO2006/133964
PCT Pub. Date: Dec. 21, 2006

(65) Prior Publication Data
US 2008/0211254 A1 Sep. 4, 2008

(30) Foreign Application Priority Data

Jun. 16, 2005 (DE) .......................... 10 2005 028 009
Jul. 22, 2005 (DE) .......................... 10 2005 034 954
Jan. 5, 2006 (DE) .......................... 10 2006 000 994

(51) Int. Cl.
*B60P 1/44* (2006.01)

(52) U.S. Cl.
CPC .............. *B60P 1/4471* (2013.01); *B60P 1/4414* (2013.01)

(58) Field of Classification Search
USPC .................................................. 414/556, 557
See application file for complete search history.

(56) References Cited

U.S. PATENT DOCUMENTS

| | | | | |
|---|---|---|---|---|
| 1,500,284 A * | 7/1924 | Stubbs | ............................ | 269/58 |
| 1,929,112 A * | 10/1933 | Hansen | ........................ | 414/557 |
| 2,088,648 A * | 8/1937 | Hansen | ........................ | 414/557 |
| 2,527,818 A * | 10/1950 | Ives | ................................ | 414/557 |
| 2,966,996 A * | 1/1961 | Friend, Jr. | ....................... | 414/652 |
| 3,842,997 A * | 10/1974 | Sprikkelman | ................. | 414/557 |
| 4,363,590 A * | 12/1982 | Crate | ............................. | 414/518 |
| 4,780,044 A * | 10/1988 | Elskamp | ....................... | 414/557 |
| 4,787,809 A * | 11/1988 | Zrostlik | ........................ | 414/557 |
| 5,020,323 A * | 6/1991 | Hurlimann | .................... | 414/718 |
| 5,118,246 A * | 6/1992 | Saussard et al. | .............. | 414/557 |
| 5,178,505 A * | 1/1993 | Smith | ............................ | 414/703 |
| 5,181,820 A * | 1/1993 | Sjogren et al. | ............... | 414/397 |
| 5,238,361 A * | 8/1993 | Liqui | ............................ | 414/678 |
| 5,391,039 A * | 2/1995 | Holtom | ........................ | 414/408 |
| 5,588,793 A * | 12/1996 | Chang | ........................... | 414/557 |
| 5,641,262 A * | 6/1997 | Dunlop et al. | ................ | 414/557 |
| 5,725,348 A * | 3/1998 | Drake | ........................... | 414/558 |
| 5,941,677 A * | 8/1999 | De Boer | ....................... | 414/557 |
| 6,386,817 B1 * | 5/2002 | Cash | .............................. | 414/462 |
| 6,893,203 B2 * | 5/2005 | Anderson et al. | ............. | 414/557 |
| 2001/0014272 A1 * | 8/2001 | Ochoa et al. | .................. | 414/462 |

FOREIGN PATENT DOCUMENTS

| | | | | |
|---|---|---|---|---|
| DE | 3228765 A1 * | 2/1984 | ..................... | 414/557 |
| EP | 0541421 A1 * | 5/1993 | ..................... | 414/556 |
| EP | 1541412 A1 | 6/2005 | | |

* cited by examiner

*Primary Examiner* — James Keenan
(74) *Attorney, Agent, or Firm* — Bachman & LaPointe, PC

(57) ABSTRACT

Disclosed is a tailgate, especially for a vehicle, comprising a platform (1) which is joined to a lifting/lowering mechanism (11) via at least one arm (2.1, 2.2). The platform (1) forms a rotary shaft (A) along with the support arm (2.1, 2.2) while the support arm (2.1, 2.2) forms a swiveling shaft (S) along with the lifting/lowering mechanism (11). A motor (3, 13) is to be allocated to the rotary shaft (A) and/or the swiveling shaft (S).

22 Claims, 2 Drawing Sheets

TAILGATE

BACKGROUND OF THE INVENTION

The invention relates to a tailgate, in particular for a vehicle, with a platform which is connected to a lifting/lowering mechanism via at least one supporting arm, the platform forming an axis of rotation with the supporting arm, and the supporting arm forming a pivot axis with the lifting/lowering mechanism.

Diverse forms and embodiments of tailgates are known and are on the market. They are driven exclusively hydraulically, with the hydraulics of the tailgate generally being connected to the hydraulics of the vehicle. A multiplicity of hoses are provided for this purpose, the hoses having the disadvantage that they and the corresponding hydraulic cylinder are fitted in an exposed position on the rear side of the vehicle. Particularly during reversing, the hydraulic hoses and the sensitive piston rods are frequently subject to mechanical damage, which leads not only to malfunctions but also to leakages, and therefore hydraulic oil escapes and environmental damage arises. This is intensified particularly in winter due to minus temperatures and road salt loading.

Added to this is the fact that, should the hydraulics be damaged, the tailgate can no longer be closed and, for example, the content of a freight compartment which is closed by the tailgate is exposed to environmental effects. If the freight compartment is a refrigerated container, then refrigeration can no longer take place.

A further disadvantage of conventional tailgates is the parallelogram with which the movements are coordinated with one another. At steep attachment angles, the parallelogram spacing is reduced, as a result of which the forces which act on the joints increase. Only pivoting ranges and lifting ranges of approx. 90° can therefore be implemented.

Furthermore, a disadvantage of conventional tailgates resides in the fact that, in the event of a failure, for example of the hydraulics or the like, it is not possible to produce proof as to whether this failure was caused due to operation, that is to say due to frequent use, or due to the manufacturing. That is to say that, for example, claims for compensation can be difficult to get accepted because, for example, it cannot be proved how many loading cycles such a tailgate has already passed through. It is therefore not possible to establish whether the failure was caused due to a fault of the tailgate itself or else due to the handling.

Furthermore, as a rule a special workshop has to be approached in order to eliminate the failure in the system, since the user himself is unable to establish in situ where the damage is and is also unable to eliminate it.

SUMMARY OF THE INVENTION

It is the object of the present invention to provide a tailgate of the abovementioned type which has a substantially improved drive. Furthermore, it is to be possible to monitor the handling and the operation of a tailgate in order to discover failures in the system as soon as possible and to be able to eliminate them in situ. Furthermore, it is to be possible to be able to continue to operate the tailgate even when there are failures in the system or a breakdown of the electrics.

To achieve the object, a motor is assigned to the axis of rotation and/or to the pivot axis.

This motor has the advantage that the above-described disadvantages of the hydraulics are completely eliminated. There is no hydraulic oil, no hydraulic hoses which may become leaky and no hydraulic cylinders, the piston rods of which are put at considerable risk in an exposed position.

An appropriate motor is especially an electrically operated servomotor or control motor with which limited rotational movements in both directions of rotation can also be carried out.

Since, of course, considerable forces act on the motor, it would probably prove advisable to provide at least one gear mechanism for the transmission of the motorized force. The manner in which the gear mechanism is configured can be determined for the particular platform and the particular use of the tailgate.

As a safeguard, for example should the motor break down, one or more brakes can be assigned to the motor and/or the gear mechanism, said brakes locking, for example, if a certain rotational speed is exceeded. It is also conceivable for the gear mechanism to be of self-locking design. However, if the gear mechanism is not of self-locking design, a lowering of the tailgate can be used in order, for example, to charge a battery. In this case, the motor for the pivot axis would be converted into a generator.

The arrangement of the motors with the gear mechanisms furthermore has the advantage that, should the electrics break down, the platform can be actuated manually from the outside with a crank or the like via a bevel gear, and therefore the platform is nevertheless rotated or the entire tailgate lowered or raised. This makes it possible to prevent, for example when transporting items to be refrigerated in the cargo compartment, the latter from being unable to be closed and therefore the items to be refrigerated being spoiled. A bevel gear of this type can be arranged, for example, on a connection between motor and gear mechanism. Further possibilities for manual actuation of the gear mechanism are conceivable and are to be covered by the present invention.

The provision of the motors also has considerable advantages in terms of the controlling means. The tailgate and the operation thereof can be interrogated and controlled in a simple manner via corresponding sensors and limit switches.

Furthermore, a controlling means, for which protection is sought separately, can be assigned to the motor and/or to the gear mechanisms. The controlling means is preferably arranged in the region of a control panel for the platform. The controlling means is preferably connected to the motor in order to determine the motor current. The motor current is, for example, a measure of the load which is raised. It can therefore be provided that the platform cannot be raised if it is too heavily loaded. In such cases, a lamp or the like on the vehicle, such as, for example, in the driver's cab or else in the vicinity of the platform itself, can illuminate, visibly signaling to the user that the platform is carrying too great a load. The motor only starts running again and the platform can be raised when the permissible load for the platform is reached again.

It can also be established by means of the controlling means how often the tailgate or the platform has already been in operation. This means that power electronics are generally assigned to the control electronics.

However, it is also conceivable to assign the controlling means directly to the axis of rotation and/or to the pivot axis or to arrange it in an interchangeable manner on output shafts and gear shafts.

In addition to the controlling means for measuring the motor current, a static overload recognition means can also be provided. This is preferably provided in the form of strain gauges on one or on both axes. It can therefore be ensured that overloading of the platform can be recognized and signaled even if the motor is not running and the platform has not yet moved.

The motor for the pivot axis and/or the motor for the axis of rotation is/are preferably to be completely encapsulated. By this means, the motor and, if appropriate, also the gear mechanism are not only protected but also all of the electric lines are located within the housing and are protected. For example, a single supply line from the vehicle electrics is sufficient.

The abovementioned supporting arms are provided in order to pivot the platform. Two supporting arms are sufficient, with one supporting arm being fitted in each case to one side of the housing. Said supporting arms are connected to the housing in such a manner that they rotate to a limited angle of rotation about the pivot axis. For example, each supporting arm sits with an annular collar in the housing and is correspondingly mounted there. The annular collar has the advantage that part of its inner surface can be provided with teeth or with a shell-shaped toothed ring, said shell-type toothing interacting with a pinion which is placed on the gear shaft.

The lifting/lowering mechanism therefore comprises a motor and two gear mechanisms which sit in a housing and rotate two supporting arms about the pivot axis.

The motor for the axis of rotation sits in turn in a tube which is located between the supporting arms and is connected fixedly there to the supporting arms. Corresponding gear mechanisms are also located there in the tube, preferably on both sides of the motor, and are connected to the motor.

The platform rotates about the tube, with the output shafts of the gear mechanisms preferably engaging in a rotationally fixed manner in corresponding rotational elements on the platform. For example, the platform can engage around the two supporting arms by means of a respective tube section, these tube sections then in turn being part of the axis of rotation. An output shaft of the gear mechanism engages in each case in said tube section and is secured there in a rotationally fixed manner.

The tube and/or the tube sections and/or the housing can be connected fixedly or re-releasably to the platform. The tube and/or the tube sections and/or the housing may be welded to the platform or else connected to the platform by means of other fastening means, such as, for example, screws, hooks, hook-like elements or the like.

Furthermore, it is to be provided to plug the supporting arms in a virtually rotationally fixed manner merely onto the ends of the output shaft or the gear shaft and thus to connect the axis of rotation to the pivot axis. The arrangement of the supporting arms can take place, for example, via a tongue and groove connection. However, any other possibility of arranging the supporting arms is conceivable and is to be covered by the present invention. When exchanging the tube or individual tube sections or else the housing, just one supporting arm or both of them have to be removed, and then elements in the tube, the tube sections and/or the housing can be removed and exchanged. The supporting arm or the supporting arms is/are subsequently simply plugged onto the shafts again.

Furthermore, it is conceivable to arrange the individual motors and their associated gear mechanisms on different axes, i.e., for example, on two or more axes. Although this does not simplify the arrangement, it is nevertheless to be covered by the present invention.

The arrangement of both one motor on the axis of rotation and one motor on the pivot axis now permits the parallelogram to be dispensed with, with the omission of said parallelogram also, of course, being covered by the invention. Since the pivoting range and the rotational range realized by the motors is not restricted to approx. 90°, the electric motor drives can also be used for further functions. This includes, for example, the production of a folding movement in the case of tailgates which can be folded down.

However, the possibility of designing the supporting arms in a telescopic manner, with two profiles being displaceable one inside the other, is also appropriate. In this case, it suffices to assign a spindle with a spindle drive to a profile such that said one profile can be extended in relation to the other profile.

Furthermore, an inclination sensor can be provided in the system, the inclination sensor ensuring, during the operation of the tailgate or of the platform, that said tailgate or platform always maintains a horizontal position. This is of advantage in particular in the case of inclinations of the road where a load located on the platform is to be prevented from rolling off the platform due to the inclination of the road.

The tailgate according to the invention can be used in a highly versatile manner. It is used, in particular, in conjunction with vehicles, where the term vehicle is not to be interpreted as restrictive. A tailgate of this type may also be arranged on a ramp of a warehouse.

The manner in which the individual components are arranged on the axis gives rise to the possibility of plugging the individual components together in the manner of a plug-in system. The exchangeability of the individual components is thereby made possible and is simplified.

DESCRIPTION OF THE FIGURES

Further advantages, features and details of the invention emerge from the description below of preferred exemplary embodiments and with reference to the drawing, in which.

DETAILED DESCRIPTION

Figure 1:
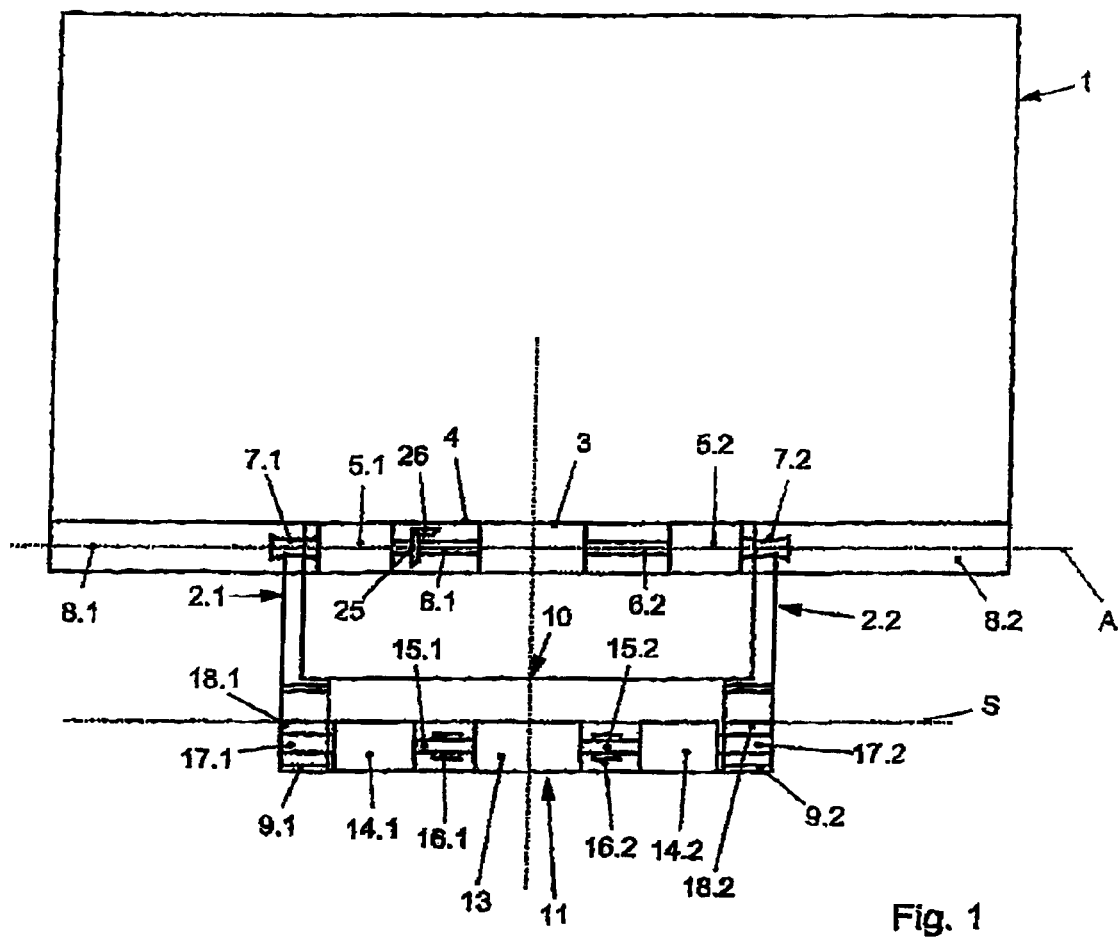
FIG. 1 shows a plan view of a tailgate according to the invention.
Figure 2:
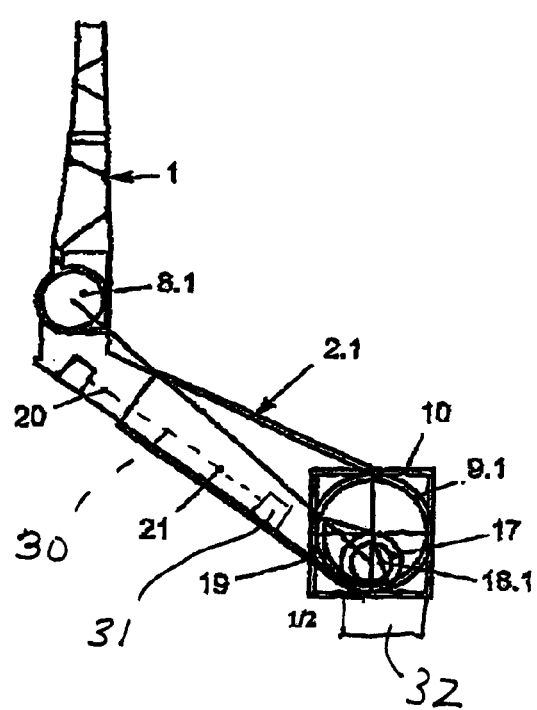
FIG. 2 shows an enlarged side view (partially illustrated) of the tailgate according to FIG. 1.

According to FIGS. 1 and 2, a tailgate according to the invention has a platform 1 which comprises, for example, a plurality of extruded aluminum profiles. Said platform 1 is connected to two supporting arms 2.1 and 2.2, the platform 1 forming an axis of rotation A with the supporting arms 2. The platform 1 is rotatable about said axis of rotation A in relation to the supporting arms 2.1 and 2.2, the rotational movement being brought about by a motor 3 which sits in a tube 4. Said tube 4 is located between the two supporting arms 2.1 and 2.2 and is connected fixedly to the supporting arms 2.1 and 2.2, with a releasable connection likewise being conceivable, in particular if, as described further below, the tube 4 is also connected releasably to the platform 1.

Furthermore, two gear mechanisms 5.1 and 5.2 which have a corresponding connection 6.1 and 6.2 to the motor 3 are located in said tube 4. Each gear mechanism 5.1 and 5.2 has an output shaft 7.1 and 7.2 which enter into a rotationally fixed connection with the platform 1. For this purpose, the platform 1 has, for example on both sides, tube sections 8.1 and 8.2 which each have, toward the output shaft 7.1 and 7.2, a recess with at least one axially parallel groove in which the output shaft 7.1 and 7.2 engages by means of a corresponding projection. In this manner, the platform 1 can be rotated about the axis of rotation A during the operation of the motor 3.

The tube 4 and/or the tube sections 8.1 and 8.2 are releasably connected to the platform 1 preferably by means of fastening means (not shown specifically), such as, for example, screws, hooks, hook-like elements or the like. A removal of the tube 4 and/or of the tube sections 8.1 and 8.2 from the platform 1 is thereby possible. All that needs to be done is for the respective fastening means to be released. However, a fixed connection between the tube 4 and/or the tube sections 8.1 and 8.2 and the platform 1 is likewise possible.

A bevel gear 25 can be provided at least on one of the connections 6.1 or 6.2, the bevel gear being in engagement with a driving wheel 26 which can be reached by a hand crank (not shown specifically) via at least two approximately opposite holes (not shown specifically) in the tube 4. This makes it possible, for example, if the electrics should break down, for the bevel gear 25 to be moved by means of the hand crank, as a result of which the platform 1 can be pivoted even without the aid of the motor 3 or the gear mechanisms 5.1 and 5.2, i.e. manually.

Figure 3:
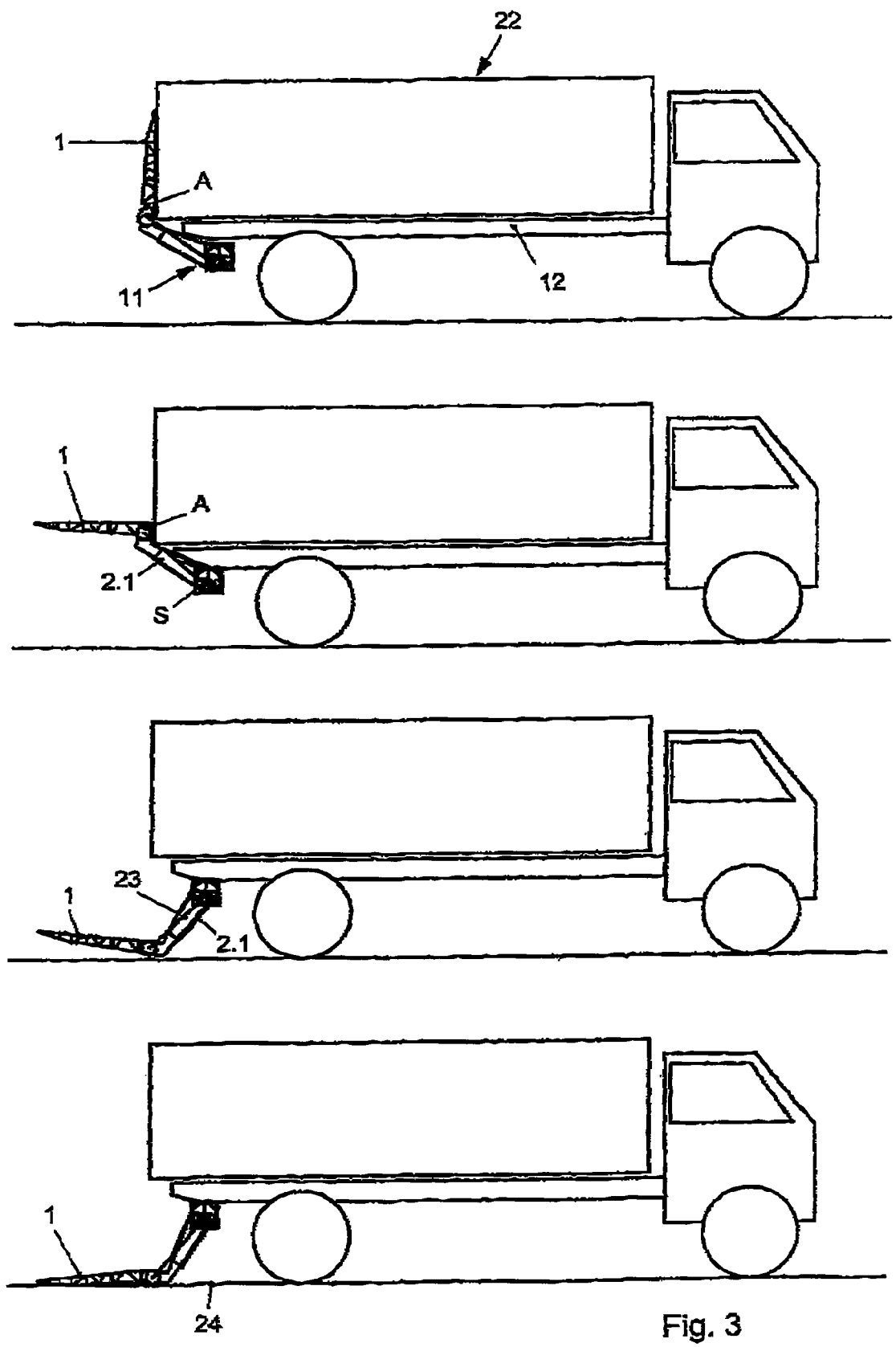
FIG. 3 shows a schematically illustrated sequence of movement of the tailgate according to the invention as per FIG. 1 on a truck.

Each supporting arm 2.1 or 2.2 has an annular collar 9.1 or 9.2 with which it engages in a housing 10 which is part of a lifting/lowering mechanism 11. Said lifting/lowering mechanism 11 can be fixed, for example, as shown in FIG. 3, below the floor 12 of a truck loading surface. The annular collars 9.1 and 9.2 rotate about a pivot axis S which runs through the housing 10.

The housing 10 can be connected releasably to the platform 1, likewise preferably by means of fastening means (not shown specifically), such as, for example, screws, hooks, hook-like elements or the like. Removal of the housing 10 or of sections thereof from the platform 1 is thereby possible. All that needs to be done is for the respective fastening means to be released. However, a fixed connection between the housing 10 and the platform 1 is likewise possible.

The rotational movement of the supporting arms 2.1 and 2.2 about the pivot axis S is in turn brought about by a motor 13 which is located within the housing 10. The motor 13 sits approximately in the center between two gear mechanisms 14.1 and 14.2 and, if appropriate, below the pivot axis S. It has corresponding connections 15.1 and 15.2 with the gear mechanisms 14.1 and 14.2, with it being possible for brakes 16.1 and 16.2 (only illustrated schematically) to be assigned to said connections 15.1 and 15.2. A manually actuable bevel gear drive, similar to the bevel gear drive 25/26, can likewise be assigned to the connections 15.1 and 15.2, as has already been described above in conjunction with the connections 6.1 and 6.2.

On each gear shaft 17.1 and 17.2 which engages in the particular annular collar 9.1 and 9.2, respectively, there sits a pinion 18.1 and 18.2 which can be moved by a shell-type toothing 19 in the annular collar 9.1 and 9.2.

Furthermore, the supporting arms 2.1 and 2.2 can be placed on the respective ends of the output shafts 7.1 and 7.2 and of the gear shaft 17.1 and 17.2, for example by means of a tongue and groove connection (not shown specifically). The supporting arms 2.1 and 2.2 can thereby easily be released, if appropriate, from the output shaft 7.1 and 7.2 and the gear shaft 17.1 and 17.2.

Each supporting arm 2.1 and 2.2 comprises two profiles 20 and 21 which are displaceable one inside the other. In this case, a spindle 30 can be assigned, for example, to the profile 20 and, if it is actuated, for example, by means of electric motor 31, brings about an extension of the profile 20 out of the profile 21.

The operation of the present invention is explained in more detail with reference to FIG. 3:

The tailgate can be seen in a closed position at the top in FIG. 3. In this case, the platform 1 covers at least part of a loading opening of the truck 22. The lifting/lowering mechanism 11 is concealed below the floor 12.

If a loading or unloading operation is now to be carried out, first of all the motor 3 is set into motion by a control panel (not shown specifically) on the vehicle being actuated. By this means, the platform 1 is rotated about the axis of rotation A into a horizontal position. Since the axis of rotation A directly adjoins the loading surface of the truck, it is now possible for, for example, an item to be loaded to be moved from the loading platform of the truck onto the platform.

Subsequently, the supporting arms 2.1 and 2.2 pivot about the pivot axis S, which is brought about by the motor 13. In this case, a mechanical connection 23 (only indicated schematically) could be arranged between the pivot axis S and the axis of rotation A, the connection causing the platform 1 to remain in the horizontal position. However, the two motors 13 and 3 are preferably connected in terms of controlling means in such a manner that, when the supporting arms 2.1 and 2.2 are pivoted, the motor 13 rotates counterclockwise, but the motor 3 rotates simultaneously in the clockwise direction, for which purpose corresponding control elements are provided.

Finally, the motor 3 is set into action once again, to be precise counterclockwise, until the platform 1 sits on a ground surface 24.

A controlling means 32 (FIG. 2) which controls the system is provided in the vicinity of the control panel. If the controlling means establishes that there is a failure in the system, a breakdown of the electrics, overloading of the platform 1 or the like, it transmits a corresponding signal which can be seen by the user, and therefore the latter can react. If elements on the axis of rotation A or the pivot axis S are affected, then the user can act in situ by releasing the supporting arms 2.1 and/or 2.2 from the output shaft 7.1 and/or 7.2 and the gear shaft 17.1 and/or 17.2 and also the corresponding fastening means between the tube 4, the tube sections 8.1 and 8.2 and/or the housing 10 and the platform 1 of the tailgate, removing the respectively affected elements from the output shaft 7.1 and/or 7.2 and from the gear shaft 17.1 and/or 17.2 and, if appropriate, replacing them for new ones which are in turn pushed onto the output shaft 7.1 and/or 7.2 and the gear shaft 17.1 and/or 17.2. The tube 4, the tube sections 8.1 and 8.2 and/or the housing 10 can subsequently be fastened again to the platform 1 and the supporting arms 2.1 and/or 2.2 can be subsequently plugged again onto the output shaft 7.1 and/or 7.2 and the gear shaft 17.1 and/or 17.2.

LIST OF DESIGNATIONS

| | |
|---|---|
| 1 | Platform |
| 2 | Supporting arm |
| 3 | Motor |
| 4 | Tube |
| 5 | Gear mechanism |
| 6 | Connection |
| 7 | Output shaft |
| 8 | Tube section |
| 9 | Annular collar |
| 10 | Housing |
| 11 | Lifting/lowering mechanism |
| 12 | Floor |
| 13 | Motor |
| 14 | Gear mechanism |
| 15 | Connection |
| 16 | Brake |
| 17 | Gear shaft |
| 18 | Pinion |
| 19 | Shell-type toothing |
| 20 | Profile |

| | |
|---|---|
| 21 | Profile |
| 22 | Truck |
| 23 | Connection |
| 24 | Ground surface |
| 25 | Bevel gear |
| 26 | Driving wheel |
| 27 | |
| 28 | |
| 29 | |
| 30 | |
| 31 | |
| 32 | |
| 33 | |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| A | Axis of rotation |
| S | Pivot axis |

The invention claimed is:

1. A tailgate for a motor vehicle, comprising a platform (1) which is connected to a lifting/lowering mechanism (11) via at least one supporting arm (2.1, 2.2), wherein the platform (1) forms an axis of rotation (A) with the at least one supporting arm (2.1, 2.2), and wherein the at least one supporting arm (2.1, 2.2) forms a pivot axis (S) with the lifting/lowering mechanism (11), characterized in that a first motor (3) is arranged on the axis of rotation (A) and a second motor (13) is arranged on the pivot axis (S), the first motor (3) rotating the platform about the axis of rotation (A) and the second motor (13) rotating the at least one supporting arm (2.1, 2.2) about the pivot axis (S), characterized in that at least one gear mechanism (5.1, 5.2; 14.1, 14.2) is engaged with the first and second motors (3, 13) respectively, and characterized in that the at least one gear mechanism (5.1, 5.2; 14.1, 14.2) is self-locking.

2. The tailgate as claimed in claim 1, characterized in that the first and second motors (3, 13) are servomotors or control motors.

3. The tailgate as claimed in claim 1, characterized in that at least one brake (16.1, 16.2) is arranged on the first and second motors (3, 13) and/or the at least one gear mechanism (5.1, 5.2; 14.1, 14.2).

4. The tailgate as claimed in claim 1, characterized in that the second motor (13) for the pivot axis (S) is mounted in a housing (10).

5. The tailgate as claimed in claim 4, characterized in that the housing (10) is connected releasably to the platform (1).

6. The tailgate as claimed in claim 4, characterized in that the housing (10) is connected fixedly to the platform (1).

7. The tailgate as claimed in claim 4, characterized in that a respective supporting arm of the at least one supporting arm (2.1, 2.2) is fitted to each side of the housing (10), each respective supporting arm rotating about the pivot axis (S).

8. The tailgate as claimed in claim 7, characterized in that the respective supporting arm (2.1, 2.2) is mounted in the housing (10) through an annular collar (9.1, 9.2).

9. The tailgate as claimed in claim 8, characterized in that at least part of the inner surface of the annular collar (9.1, 9.2) is provided with teeth (19) which interact with a pinion (18.1, 18.2) which is placed on a gear shaft (17.1, 17.2).

10. The tailgate as claimed in claim 9, characterized in that each respective supporting arm (2.1, 2.2) is arranged releasably on the gear shaft (17.1, 17.2).

11. The tailgate as claimed in claim 1, characterized in that the first motor (3) for the axis of rotation (A) is mounted in a tube (4).

12. The tailgate as claimed in claim 11, characterized in that the tube (4) is connected releasably to the platform (1).

13. The tailgate as claimed in claim 11, characterized in that the tube (4) is connected fixedly to the platform (1).

14. The tailgate as claimed in claim 11, characterized in that the at least one supporting arm comprises two supporting arms, and wherein the tube (4) is located between the supporting arms (2.1, 2.2) and rotates about the axis of rotation (A).

15. The tailgate as claimed in claim 11, characterized in that a respective gear mechanism (5.1, 5.2) is provided in the tube (4) on both sides of the first motor (3), and output shafts (7.1, 7.2) of said gear mechanisms are connected fixedly to the platform (1).

16. The tailgate as claimed in claim 15, characterized in that the at least one supporting arm (2.1, 2.2) is connected releasably to the output shafts (7.1, 7.2).

17. The tailgate as claimed in claim 11, characterized in that a respective gear mechanism (5.1, 5.2) is provided in the tube (4) and an output shaft (7.1, 7.2) of said respective gear mechanism is connected releasably to the platform (1).

18. The tailgate as claimed in claim 17, wherein the at least one gear mechanism (5.1, 5.2) is provided in the tube (4) on both sides of the first motor (3).

19. The tailgate as claimed in claim 1, characterized in that the at least one supporting arm (2.1, 2.2) is of telescopic design, with two profiles (20, 21) being displaceable one inside the other.

20. The tailgate as claimed in claim 19, characterized in that a spindle drive which can be actuated by electric motor is engaged at least to one of the two profiles (20).

21. The tailgate as claimed in claim 1, characterized in that the at least one gear mechanism (5.1, 5.2, 14.1, 14.2) is connected to the first and second motors (3, 13) via a corresponding connection (6.1, 6.2, 15.1, 15.2) and wherein a bevel gear (25) which can be driven manually is provided on the connection (6.1, 6.2, 15.1, 15.2).

22. The tailgate as claimed in claim 1, characterized in that a controlling means is provided for controlling the first and second motors (3, 13) and/or the at least one gear mechanism (5.1, 5.2, 14.1, 14.2).

\* \* \* \* \*